Jan. 12, 1960 — F. H. REDER — 2,921,269
MOLECULAR RESONANCE DEVICES
Filed March 18, 1958

INVENTOR,
FRIEDRICH H. REDER.
BY
Harry M. Saragovitz
ATTORNEY.

United States Patent Office 2,921,269
Patented Jan. 12, 1960

2,921,269

MOLECULAR RESONANCE DEVICES

Friedrich H. Reder, Long Branch, N.J., assignor to the United States of America as represented by the Secretary of the Army Application March 18, 1958, Serial No. 722,358

10 Claims. (Cl. 331—94)

(Granted under Title 35, U.S. Code (1952), sec. 266)

The invention described herein may be manufactured and used by or for the Government for governmental purposes without the payment of any royalty thereon.

This invention relates to microwave resonance devices, and particularly to oscillators known as Masers, in which radiation is produced during transitions of molecular particles to lower energy states. The frequency of this radiation is termed the transition frequency.

The frequencies of signals generated by such oscillators are sometimes extremely high and must be considerably reduced to be of practical value. One method is to use two Masers operating at displaced frequencies which are heterodyned to provide a stable beat frequency. A simplified version of this method is to employ a single beam of ammonia molecules traversing two cascaded single mode cavities which are respectively tuned to different inversion lines of the molecular beam. A description of this version may be found in the paper of W.Higa, "Maser Engineering," External Publicaiton 381, Jet Propulsion Laboratory, April 25, 1957.

It is a principal object of the invention to further simplify the above-mentioned system.

It is a further object of the invention to provide a molecular oscillator in which a single cavity resonator sustains two modes of oscillation simultaneously, said modes being tuned to different inversion lines of the molecular beam.

In accordance with the invention, the single cavity resonator in which the transition oscillations of the molecular beam take place is so proportioned that it is simultaneously tuned to two different resonator modes, e.g., to one transition frequency in the $TM_{110}$ mode and to another relatively closely spaced transition frequency in the $TE_{011}$ mode. The two frequencies will thus be simultaneously sustained, and can then be heterodyned in a mixer to provide a stable difference frequency.

For a better understanding of the invention, together with other and further objects thereof, reference is had to the following description taken in connection with the accompanying drawing, in which.

Figure 1:
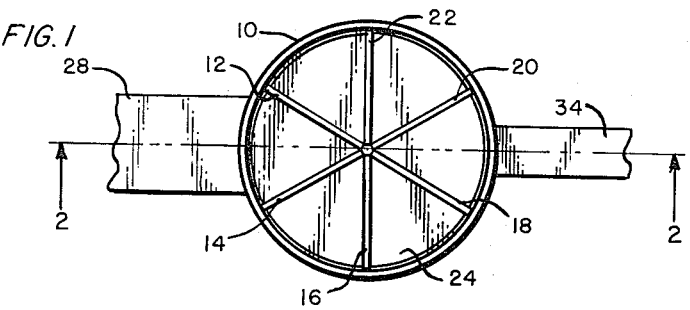
Fig. 1 is a top plan view of a Maser cavity built in accordance with the invention.
Figure 2:
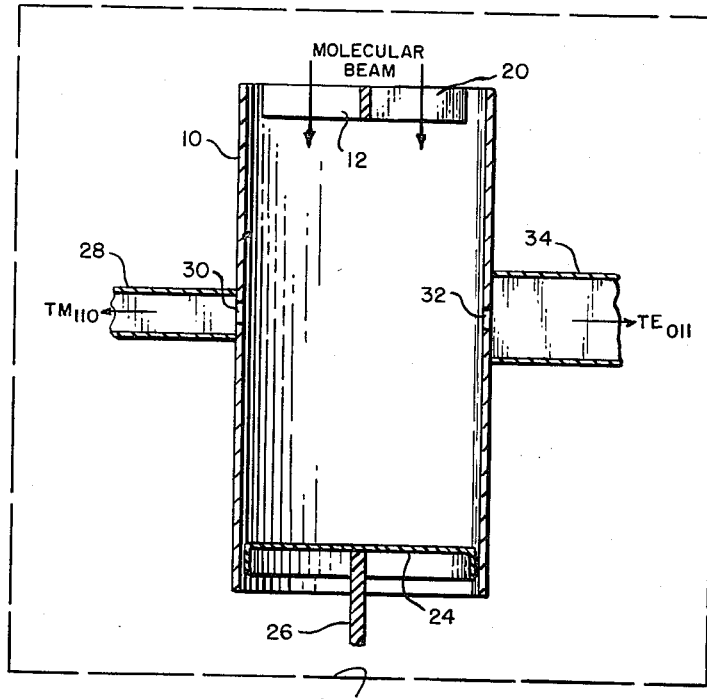
Fig. 2 is a longitudinal section along line 2—2 of Fig. 1.

Referring now to Figs. 1 and 2, the Maser cavity 10 is cylindrical in shape. At the top of the cavity are a series of radial baffles 12 to 22, extending across the cavity and spaced at equal angles. This subdivides the cavity opening into a series of smaller openings which permit entry of the molecular beam of ammonia and which, at the same time, are at cutoff to both oscillating modes generated in the cavity.

As above pointed out, the cavity is dimensioned to simultaneously sustain two modes corresponding to two closely spaced transition frequencies of the molecular beam. In the case of ammonia gas, several modes, as well as several resonance lines, are available. As an example, a suitable pair of modes is given in the following table:

| Transition JK | Frequency, kmc. | Mode | $Q_0$ theor. | $X_{lm}$ | $n$ |
|---|---|---|---|---|---|
| 3, 3 | 23, 870 | $TE_{011}$ | 16, 940 | 3, 832 | 1 |
| 2, 2 | 23, 722 | $TM_{110}$ | 14, 760 | 3, 832 | 0 |

In the above table, J is the angular momentum of the molecule, K is the projection of J on the axis of symmetry, $Q_0$ is the unloaded Q of the cavity, $X_{lm}$ is the $m_{th}$ zero of the $l_{th}$ Bessel function, and $n$ is the number of half wavelength variations along the Z axis of the field variation along the cavity axis.

The length and diameter of the cylindrical cavity for the two frequencies can be found from the following equation:

$$(fD)^2 = \frac{CX_{lm}}{\pi} + \left(\frac{C_n}{2}\right)^2 \left(\frac{D}{L}\right)^2$$

where D and L are the diameter and length of the cavity, respectively, $f$ is the resonant frequency of the cavity and C is the velocity of light.

Using in the above equation the values in the above table, the diameter and length, in centimeters, are:

$$D = \sqrt{\frac{(n_2 x_1)^2 - (n_1 x_2)^2}{(n_2 f_1)^2 - (n_1 f_2)^2}} = 1.541 \text{ cm.}$$

$$L = \sqrt{\frac{(n_1 x_2)^2 - (n_2 x_1)^2}{(x_2 f_1)^2 - (x_1 f_2)^2}} = 5.657 \text{ cm.}$$

The $TE_{011}$ mode is tuned by means of a movable plunger 24 which is slidable along the length of the cavity by means of a handle 26 attached thereto. The $TM_{110}$ mode is substantially independent of any length variation, but can be turned by means of a metal or dielectric rod which can be movable into the cavity. To reduce the amount of insertion of the rod in order to reduce its influence on the other mode, the cavity can be pretuned as closely as possible to the $TM_{110}$ mode frequency by precisely controlling its diameter, e.g., by successive grinding and frequency measuring steps. As an alternative or as supplemental thereto, the cavity can be precisely tuned to the $TM_{110}$ mode frequency by placing it in an oven, varying the temperature until the tuning is precise, and automatically maintaining said temperature. After precise tuning of the $TM_{110}$ mode has been accomplished, fine adjustment for the $TE_{011}$ mode is accomplished by varying the length of the cavity by means of the plunger 24.

The two signals induced in the cavity by the Maser beam can be extracted by means of rectangular wave guide 28 and 34 respectively coupled to the cavity through irises 30 and 32. For best $TE_{011}$ iris coupling, wave guide 34 is oriented with its longer dimension parallel to the cavity axis, while for best $TM_{110}$ iris coupling, wave guide 28 is oriented with its longer dimension perpendicular to said axis. To avoid Doppler shifts of the frequency, the coupling iris should be located midway along the length of the cavity.

Figure 3:
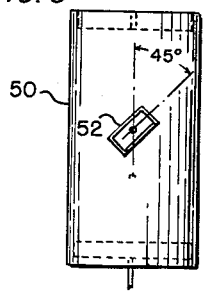
Fig. 3 is an elevational view of a modification of cavity shown in Figs. 1 and 2.
Figure 4:
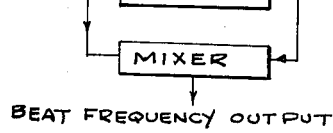
Fig. 4 is a diagrammatic view illustrating an arrangement for heterodyning the output frequencies of the device.

A single wave guide can be used to extract both modes as, shown in Fig. 3, wherein the wave guide 52 is oriented 45° relative to the cavity axis. In all other respects the cavity in Fig. 3 is similar to that in Fig. 2.

Both of the frequencies generated in the cavity are now applied to a mixer where they are heterodyned to provide a stable difference beat frequency which can be utilized.

Among the advantages of the above system are:

(1) Both signals are induced in the same cavity and a thermal variation will affect both frequencies substantially equally, so that the difference frequency will remain substantially constant. Hence, the temperature need not be so closely regulated and a relatively small oven can be used, compared to the large oven necessary for the prior two-cavity system.

(2) Any dielectric detuning of the cavity due to beam density variations will also affect both frequencies substantially equally, and this is not necessarily the same case with the two-cavity system.

(3) A single cavity is smaller in size, an important factor portability and compactness. In addition, all parts of the cavity can more easily be kept at the same temperature.

While there has been described what is at present considered a preferred embodiment of the invention, many changes may be made without departing from the true spirit and scope of the invention, as defined in the appended claims.

What is claimed is:

1. A molecular oscillator comprising a single cavity resonator in which a beam of molecules radiate oscillations during transitions to lower energy states, said resonator being simultaneously tuned to two frequencies corresponding to two relatively closely spaced transition frequencies of said molecules, whereby both frequencies are sustained.

2. A molecular oscillator comprising a cylindrical cavity resonator in which a beam of molecules radiate oscillations during transitions to lower energy states said resonator being simultaneously tuned to two modes corresponding to two relatively closely spaced transition frequencies of said molecules, whereby both frequencies are sustained.

3. A Maser oscillator comprising a cylindrical cavity resonator to which ammonia molecules radiate oscillations during transitions to lower energy states, said resonator being simultaneously tuned to a TM mode and a TE mode respectively corresponding to two relatively closely spaced inversion lines of said molecules, means for heterodyning the frequencies corresponding to said inversion lines whereby a stable difference frequency is produced.

4. A Maser oscillator comprising a cylindrical cavity resonator in which ammonia molecules radiate oscillations during transitions to lower energy states, said resonator being simultaneously tuned to the $TE_{011}$ mode and the $TM_{110}$ mode respectively corresponding to the 3,3 and 2,2 inversion lines of said molecules, whereby oscillations of the frequencies of both inversion lines are sustained and means for heterodying said frequencies whereby a stable difference frequency is produced.

5. A Maser oscillator as set forth in claim 4, including in addition a pair of rectangular transmission lines coupled to said cavity resonator and respectively responsive to said $TE_{011}$ and $TM_{110}$ modes for separately extracting said frequencies from said resonator.

6. A Maser oscillator as set forth in claim 4, including a single wave guide coupled to said cavity resonator for simultaneously extracting therefrom both of said frequencies.

7. A Maser oscillator as set forth in claim 6, wherein said wave guide is rectangular and the sides thereof are at an angle of 45 degrees to the axis of said resonator.

8. A Maser oscillator as set forth in claim 4, including means to independently tune said resonator to said modes.

9. A Maser oscillator as set forth in claim 8 wherein said means comprises separate means for controlling the length and diameter of said resonator.

10. A Maser oscillator as set forth in claim 9, wherein the means for controlling said diameter comprises means for varying the temperature thereof.

References Cited in the file of this patent
UNITED STATES PATENTS

| | | |
|---|---|---|
| 2,593,095 | Brehm | Apr. 15, 1952 |
| 2,632,808 | Lawson | Mar. 24, 1953 |
| 2,770,778 | Parker | Nov. 13, 1956 |

OTHER REFERENCES

"New Microwave Amplifier," by Suhl in Radio Electronics, vol. 28, No. 9, page 45, September 1957.

"The Maser," by Gordon et al., in Physical Review, vol. 99, No. 4, August 15, 1955, pp. 1264–1274.